(12) United States Patent
Hirayama et al.

(10) Patent No.: US 11,634,601 B2
(45) Date of Patent: Apr. 25, 2023

(54) AQUEOUS INK COMPOSITION FOR BALLPOINT PEN

(71) Applicant: MITSUBISHI PENCIL COMPANY, LIMITED, Tokyo (JP)

(72) Inventors: Akiko Hirayama, Tokyo (JP); Kousuke Ogura, Tokyo (JP); Kana Miyoshi, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 540 days.

(21) Appl. No.: 16/627,568

(22) PCT Filed: Jun. 22, 2018

(86) PCT No.: PCT/JP2018/023827
§ 371 (c)(1),
(2) Date: Dec. 30, 2019

(87) PCT Pub. No.: WO2019/004084
PCT Pub. Date: Jan. 3, 2019

(65) Prior Publication Data
US 2020/0165473 A1    May 28, 2020

(30) Foreign Application Priority Data
Jun. 30, 2017   (JP) .............................. JP2017-128431

(51) Int. Cl.
| C09D 11/00 | (2014.01) |
| C09D 11/18 | (2006.01) |
| C09D 1/00 | (2006.01) |
| C09D 4/00 | (2006.01) |
| C09D 5/00 | (2006.01) |
| C09K 3/00 | (2006.01) |

(52) U.S. Cl.
CPC .................................. C09D 11/18 (2013.01)

(58) Field of Classification Search
USPC .................. 106/31.01, 31.13, 31.6
See application file for complete search history.

(56) References Cited

U.S. PATENT DOCUMENTS

| 2003/0125393 A1 | 7/2003 | Nakamura et al. |
| 2014/0296418 A1 | 10/2014 | Sato et al. |
| 2018/0010003 A1* | 1/2018 | Vasudevan ........... B41J 2/17503 |

FOREIGN PATENT DOCUMENTS

| JP | H03207772 A | 9/1991 |
| JP | H04013783 A | 1/1992 |
| JP | H10-101982 A | 4/1998 |
| JP | 10298480 A | * 11/1998 |
| JP | H10298480 A | 11/1998 |
| JP | 2005290197 A | 10/2005 |
| JP | 2007238736 A | 9/2007 |
| JP | 2011178973 A | 9/2011 |
| JP | 2012046637 A | 3/2012 |
| JP | 2016132749 A | 7/2016 |
| JP | 2017082154 A | 5/2017 |

OTHER PUBLICATIONS

International Search Report (PCT/ISA/210) dated Aug. 7, 2018, by the Japanese Patent Office as the International Searching Authority for International Application No. PCT/JP2018/023827.
Written Opinion (PCT/ISA/237) dated Aug. 7, 2018, by the Japanese Patent Office as the International Searching Authority for International Application No. PCT/JP2018/023827.
Notification of Transmittal of the International Preliminary Report on Patentability and International Preliminary Report on Patentability dated Jan. 9, 2020, by the International Bureau of WIPO in corresponding International Patent Application No. PCT/JP2018/023827. (7 pages).
Extended European Search Report dated Feb. 22, 2021, by the European Patent Office in corresponding European Patent Application No. 18823041.1-1102. (7 pages).

* cited by examiner

Primary Examiner — James E McDonough
(74) Attorney, Agent, or Firm — Buchanan, Ingersoll & Rooney PC

(57) ABSTRACT

To provide an aqueous ink composition for ballpoint pen having excellent ink discharge properties at the initial writing (initial touch) even after exposure of the pen tip for a long period of time. The aqueous ink composition for ballpoint pen contains at least 0.1 to 5% by mass of a graft compound of an allyl alcohol-maleic anhydride-styrene copolymer composed of: (a) a polyoxyalkylene alkyl ether unit represented by Formula (I), (b) a maleic anhydride unit, and (c) a styrene unit, the allyl alcohol-maleic anhydride-styrene copolymer having the composition ratio (a):(b):(c) of 25 to 75:25 to 75:0 to 50% by mol and having a mass average molecular weight from 1000 to 50000, and polyoxyalkylene monoalkyl alcohol; 5 to 40% by mass of resin particles; and water; wherein in Formula (I), R represents an alkyl group having 1 to 5 carbons, and m is a positive number of 5 to 50.

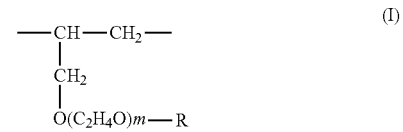

7 Claims, No Drawings

AQUEOUS INK COMPOSITION FOR BALLPOINT PEN

TECHNICAL FIELD

The present invention relates to an ink composition for aqueous ink ballpoint pen having excellent initial touch, as ink discharge properties at the initial writing, even after exposure of the pen tip for a long period of time.

BACKGROUND ART

In the related art, aqueous ink ballpoint pens using ink with a high solid content concentration such as ink containing a microcapsule pigment have problems such as the frequent occurrence of the drop in ink discharge properties at the time of initial writing (drop in initial touch) after exposure of the pen tip for a certain time.

As countermeasures for such problems, 1) an aqueous ink composition for ballpoint pen including at least a colorant, water, a thickener, and cationized dextran (e.g., see Patent Document 1), 2) an aqueous ink composition for ballpoint pen including at least water, a colorant, a water-soluble organic solvent, and one or more of pyridine derivatives prepared by substituting one to three of 2-, 4-, and 6-position carbons of pyridine with an identical hydrophilic electron donating group, and pyrimidine derivatives prepared by substituting one to three of 2-, 4-, and 6-position of carbons of pyridine with an identical hydrophilic electron donating group (e.g., see Patent Document 2), 3) an aqueous ink composition for ballpoint pen including particles composed of a specific compound (e.g., see Patent Document 3), and 4) an ink composition suitable for writing instruments including at least a compound selected from bicine and tricine in a content from 0.1 to 10% by mass relative to the total amount of the ink composition (e.g., Patent Document 4) are known.

Inventions in the related art such as those in Patent Documents 1 to 4 can achieve certain effects, however it has been desired that the effect be sustained even after exposure of the pen tip for a longer period of time.

CONVENTIONAL ART DOCUMENTS

Patent Documents

Patent Document 1: Japanese Patent Application Laid-Open No. 2007-238736 (Claims and others)
Patent Document 2: Japanese Patent Application Laid-Open No. 2012-46637 (Claims and others)
Patent Document 3: Japanese Patent Application Laid-Open No. 2011-178973 (Claims and others)
Patent Document 4: Japanese Patent Application Laid-Open No. 2016-132749 (Claims and others)

SUMMARY OF THE INVENTION

Problems to be Solved by the Invention

In light of the problems and present situation of conventional art, an object of the present invention is to provide an aqueous ink composition for ballpoint pen that has excellent ink discharge properties at the initial writing (initial touch), even after the exposure of the pen tip for a longer time.

Means for Solving the Problems

As a result of dedicated research in light of the state of the conventional art described above, the present inventors have found that the intended aqueous ink composition for ballpoint pen can be obtained by making an aqueous ink composition for writing instruments including at least water, a specific compound, and resin particles within specific ranges, and thus completed the present invention.

Specifically, the aqueous ink composition for ballpoint pen according to the present invention contains: at least 0.1 to 5% by mass of a graft compound of an allyl alcohol-maleic anhydride-styrene copolymer composed of (a) a polyoxyalkylene alkyl ether unit represented by Formula (I), (b) a maleic anhydride unit, and (c) a styrene unit, wherein the allyl alcohol-maleic anhydride-styrene copolymer having the composition ratio (a):(b):(c) of 25 to 75:25 to 75:0 to 50% by mol and having a mass average molecular weight from 1000 to 50000, and polyoxyalkylene monoalkyl alcohol; 5 to 40% by mass of resin particles; and water;

[Chemical Formula 1]

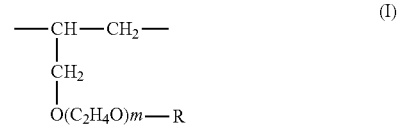

(I)

wherein in Formula (I), R represents an alkyl group having 1 to 5 carbons, and m is a positive number of 5 to 50.

Effects of the Invention

According to the present invention, provided is an aqueous ink composition for ballpoint pen having excellent ink discharge properties at the initial writing (initial touch) even after exposure of the pen tip for a long period of time.

DETAILED DESCRIPTION OF EMBODIMENTS

An embodiment of the present invention is explained below in detail.

The aqueous ink composition for ballpoint pen in an embodiment of the present invention contains at least 0.1 to 5% by mass of a graft compound of an allyl alcohol-maleic anhydride-styrene copolymer composed of (a) a polyoxyalkylene alkyl ether unit represented by Formula (I), (b) a maleic anhydride unit, and (c) a styrene unit, the allyl alcohol-maleic anhydride-styrene copolymer having the composition ratio (a):(b):(c) of 25 to 75:25 to 75:0 to 50% by mol and having a mass average molecular weight from 1000 to 50000, and polyoxyalkylene monoalkyl alcohol; 5 to 40% by mass of resin particles; and water;

[Chemical Formula 2]

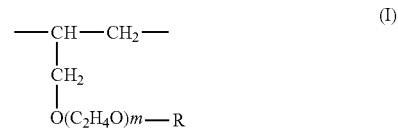

(I)

wherein in Formula (I), R represents an alkyl group having 1 to 5 carbons, and m is a positive number of 5 to 50.

The graft compound used in the present invention is a graft compound of an allyl alcohol-maleic anhydride-styrene copolymer composed of (a) a polyoxyalkylene alkyl ether unit represented by Formula (I), (b) a maleic anhydride unit, and (c) a styrene unit, the allyl alcohol-maleic anhydride-styrene copolymer having the composition ratio (a):(b):(c) of 25 to 75:25 to 75:0 to 50% by mol and having a mass average molecular weight from 1000 to 50000, and polyoxyalkylene monoalkyl alcohol.

The composition ratio of these (a), (b), and (c) units is (a):(b):(c)=25 to 75:25 to 75:0 to 50% by mol.

When the styrene unit (c) is 0% by mol, no styrene unit is included. In this case, the graft compound is a graft compound of an allyl alcohol-maleic anhydride copolymer composed of (a) a polyoxyalkylene alkyl ether unit represented by Formula (I) and (b) a maleic anhydride unit, wherein the composition ratio of (a):(b) is 25 to 75:25 to 75% by mol and having a mass average molecular weight from 1000 to 50000, and polyoxyalkylene monoalkyl alcohol.

In a case where the amount of (b) a maleic anhydride unit to (a) a polyoxyalkylene monoalkyl ether unit is out of scope of the above-described range (less or more), the effect of the present invention cannot be achieved, which is not preferable. When the styrene unit is included, in a case where the amount of styrene is more the above-described range, the effect of the present invention cannot be achieved, which is not preferable.

When (c) a styrene unit is included, the composition ratio of (a) to (c) is preferably (a):(b):(c)=25 to 40:25 to 40:20 to 50% by mol.

The molar number of addition of the ethylene oxide unit of the component (b), specifically, m in Formula (I) is 5 to 50 mol, and the use of the component within the scope achieves the effect of the present invention.

R is a linear or branched alkyl group having 1 to 5 carbon atoms, and examples thereof include linear alkyl groups such as a methyl group, an ethyl group, an n-propyl group, an n-butyl group, and an n-pentyl group, branched alkyl groups such as an isopropyl group, an isobutyl group, and an isopentyl group, and cyclic alkyl groups such as a cyclopropyl group and a cyclopentyl group.

Furthermore, the mass average molecular weight of the graft compound is from 1,000 to 50,000. In a case where the mass average molecular weight exceeds 50,000, the ink viscosity increases, while the mass average molecular weight is less than 1,000, solubility decreases, so both the cases are not preferable.

Examples of the graft compound of an allyl alcohol-maleic anhydride-styrene copolymer and polyoxyalkylene monoalkyl alcohol includes that represented by Formula (II), and the graft compound of an allyl alcohol-maleic anhydride copolymer and polyoxyalkylene monoalkyl ether include the same represented by Formula (II). The graft compound may be used alone or in combination of two or more thereof.

[Chemical Formula 3]

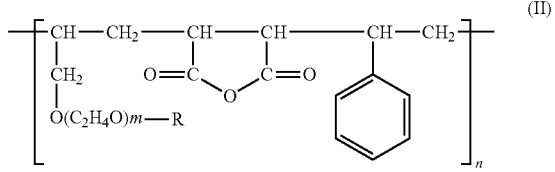

(II)

Specific examples include the graft compound that is represented by Formula (II) wherein m=11 and n=20, and which has a mass average molecular weight of 15000, such as commercially available MALIALIM AKM-0531 (manufactured by NOF Corporation), the graft compound that is represented by Formula (II) wherein m=13 and n=18, and which has a mass average molecular weight of 40000, such as commercially available MALIALIM AAB-0851 (manufactured by NOF Corporation), and the graft compound that is represented by Formula (II) wherein m=28 and n=20, and which has a mass average molecular weight of 30000, such as commercially available MALIALIM AFB-1521 (manufactured by NOF Corporation). In Formula (II), n is a positive number adjusted within the range of the above-described mass average molecular weight (the same condition is applied to Formula (III) below).

[Chemical Formula 4]

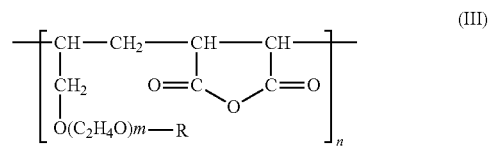

(III)

Specific examples include the graft compound that is represented by Formula (III) wherein m=11 and n=14, and which has a mass average molecular weight of 10000 [copolymer of methoxypolyethylene glycol (added with 11 mol of ethylene oxide) allyl ether and maleic anhydride], such as commercially available MALIALIM SC-0505K (manufactured by NOF Corporation).

The total content of the graft compound is from 0.1 to 5% by mass (hereinafter "% by mass" is referred to as "%"), preferably 0.2 to 4% based on the total amount of the ink composition.

In a case where the content is less than 0.1%, the effect of the present invention cannot be exhibited, while the content exceeds 5%, stability of the ink over time decreases, so both the cases are not preferable.

Examples of the resin particles used in an embodiment of the present invention include colored resin particles, hollow resin particles having voids inside the particles, and solid resin particles without voids inside the particles.

The colored resin particles that can be used herein are not particularly limited as long as particles are composed of colored resin particles, and examples thereof include 1) colored resin particles in which a colorant composed of inorganic pigments such as carbon black and titanium oxide, organic pigments such as phthalocyanine pigments and azo pigments are dispersed in resin particles, 2) colored resin particles in which the surface of the resin particles is covered with the colorant composed of the pigment as described above, 3) colored resin particles in which resin particles are stained with a colorant composed of a dye such as a direct dye, an acid dye, a basic dye, a food dye, or a fluorescent dye, 4) microspheres having a matrix composed of a polymer, a resin having OH groups, and a water-insoluble dye, 5) colored resin particles having thermochromic properties based on a leuco dye, and 6) colored resin particles having photochromic properties based on, for example, a photochromic dye (compound) and a fluorescent dye.

Examples of the resin component of the above-described colored resin particles 1) to 3) include at least one selected from polymers of acrylic acid, methacrylic acid, acrylate ester, methacrylate ester, styrene, acrylonitrile, and butadiene, or copolymers thereof, benzoguanamine, phenol resin, epoxy resin, and urethane resin. The polymers may be subjected to treatment such as crosslinking as necessary. These resins are colored by known methods such as suspension polymerization and dispersion polymerization.

The microspheres of 4) described above have a matrix composed of a polymer, a resin having OH groups, and a water-insoluble dye.

Examples of the polymer composing the matrix include epoxy polymers, melamine polymers, acrylic polymers, urethane polymers, or urea polymers, or combination thereof.

The resin having OH groups is contained in the matrix. Examples of the resin having OH groups include a terpene phenol resin, a rosin phenol resin, an alkyl phenol resin, a phenol novolak resin, a cresol novolak resin, a butyral resin, a polyvinyl alcohol resin, a polyol-modified xylene resin, an ethylene oxide-modified xylene resin, a maleate resin, a hydroxyl group-modified acrylate resin, a hydroxyl group-modified styrene acrylate resin, a carboxyl-modified acrylate resin, and a carboxyl-modified styrene acrylate resin.

The water-insoluble dye is a dye that is insoluble in water at room temperature, and may be, for example, a halochromic dye, a disperse dye, or an oil-soluble dye such as dyes having a chemical structure of azo, metal complex salt azo, anthrinaquine, or metallo-phthalocyanine. From the perspective of color development, the use of a halochromic dye is preferable.

The microspheres can be produced by, for example, the following preparation processes (emulsion polymerization method and phase separation method).

The microsphere preparation step by the emulsion polymerization method includes the steps of preparing an oil phase, preparing a water phase, and mixing the oil phase and the water phase to emulsify the components of the oil phase, followed by polymerization.

The oil phase contains an organic solvent such as phenyl glycol, benzyl alcohol, ethylene glycol monobenzyl ether, or ethyl acetate, the water-insoluble dye, the resin having OH groups, and a monomer or prepolymer. A plurality of the organic solvents may be included.

The oil phase is prepared by adding a water-insoluble dye and a resin having OH groups to an organic solvent under heating at a predetermined temperature, stirring the mixture, and then addition of a monomer or prepolymer composing a polymer, such as a melamine monomer or prepolymer, an epoxy monomer or prepolymer, an acrylic monomer or prepolymer, or an isocyanate monomer or prepolymer, followed by further addition of other optional organic solvent.

The water phase can be prepared by mixing water and a dispersant. Examples of the dispersant include, but not limited to, polyvinyl alcohol.

The emulsification and polymerization steps can be performed by emulsifying the components of the oil phase, and further polymerizing the oil phase by introducing the oil phase into the water phase and subjecting the mixture to emulsification mixing using a homogenizer or the like under heating to a predetermined temperature.

The microsphere preparation step may include other steps, such as a step of classifying the microspheres.

The microsphere preparation step by phase separation consists of preparing a dye-containing solution, preparing a solution containing a protective colloid agent, and polymerizing a monomer or prepolymer.

The dye-containing solution can be prepared by dissolving a water-insoluble dye and a resin having OH groups in an organic solvent under heating. Examples of the water-insoluble dye, the resin having OH groups, and the organic solvent include those listed for the microsphere preparation step using emulsion polymerization.

The protective colloid agent-containing solution can be prepared by dissolving a protective colloid agent in water. Examples of the protective colloid agent include a methyl vinyl ether-maleic anhydride copolymer.

Polymerization of the monomer or prepolymer can be performed by dispersing a dye-containing solution in the form of oil droplets in a protective colloid agent-containing solution that has been heated to a predetermined temperature, and addition of the above-described monomer or prepolymer to the dispersion, and stirring them with the temperature maintained. As a result, a water-insoluble dye and a resin having OH groups are included in a polymer obtained by polymerization of a monomer or prepolymer.

In the obtained microspheres, the content of the resin having OH groups in the total amount of the microspheres is preferably 1% by mass or more and 40% by mass or less, and the content of the water-insoluble dye is preferably 10% by mass or more and 45% by mass or less. The average particle size of the microspheres is preferably 0.3 µm to 3.0 µm. In an embodiment of the present invention (including the examples described below), the term "average particle size" is a value of D50 calculated based on volume by a laser diffraction method, and the measurement can be performed using, for example, a particle size distribution analyzer HRA 9320-X100 manufactured by Nikkiso Co., Ltd.

Examples of the thermochromic colored resin particles of 5) include particles produced by microencapsulating a thermochromic composition including at least a leuco dye, which is an electron-donating dye and functions as a colorant, a developer which is a component able to develop the leuco dye, and a chromic temperature modifier able to control the chromic temperature in coloration of the leuco dye and the developer to have a predetermined average particle size (e.g., 0.2 to 3 µm).

Examples of the microencapsulation method include interfacial polymerization, interfacial polycondensation, in situ polymerization, in-liquid curing coating, phase separation from an aqueous solution, phase separation from an organic solvent, melt dispersion cooling, air suspension coating, and spray drying. The method may be selected as appropriate according to the intended use. For example, in the phase separation from an aqueous solution, a leuco dye, a developer, and a chromic temperature modifier are melted by heating, added to an emulsifier solution, and dispersed in the form of oil droplets under heating and stirring. Subsequently, as capsule coat materials, resin materials having a wall coat of, for example, an urethane resin, an epoxy resin, or an amino resin, and for example an amino resin solution, specifically, a methylol melamine aqueous solution, an urea solution, a benzoguanamine solution, and other solutions are added gradually, and the mixture is allowed to react continuously to prepare a dispersion, and then the dispersion is filtered to obtain thermochromic colored resin particles composed of a thermochromic microcapsule pigment. In the thermochromic colored resin particles, the coloring and discoloring temperatures of each color can be set to proper temperatures by properly combining the types and amounts of the leuco dye, developer, and chromic temperature modifier.

Examples of the photochromic colored resin particles of 6) include particles composed of at least one or more dyes selected from photochromic dyes (compounds) and fluorescent dyes, and a resin such as a terpene phenol resin, and those produced by microcapsulating a photochromic composition including at least one or more dyes selected from photochromic dyes (compounds) and fluorescent dyes, an organic solvent, and additives such as an antioxidant, a light stabilizer, and a sensitizer to have a predetermined average particle size (e.g., 0.2 to 3 µm). The microencapsulation method may be in the same manner as in 1.6 the above-described preparation of the thermochromic resin particles.

The photochromic colored resin particles can be made colorless in an indoor lighting environment (lighting equipment in the room selected from incandescent light, fluorescent light, lamps, white LED, and the like) and develop a color in an environment irradiated with UV (an environment irradiated with a wavelength at 200 to 400 nm, or sunlight including UV) through the appropriate use of dyes such as photochromic dyes (compounds) and fluorescent dyes.

Furthermore, in the present invention, in addition to the above-described colored resin particles of 1) to 6), hollow resin particles having voids within the particles, and solid resin particles having no voids inside the particles may be used.

Examples of the materials of the hollow resin particles and solid resin particles include solid resin particles of homopolymers of polyethylene, polypropylene, polyvinyl chloride, polyvinylidene chloride, polyvinyl acetate, polystyrene, polymethylmethacrylate, polyacrylonitrile, polyamide, polycarbonate, polyacetal, polyethylene terephthalate, and polyurethane; copolymers including two or more types of monomers such as a styrene-acrylonitrile copolymer, an acrylonitrile-butadiene-styrene copolymer, and a styrene-butadiene copolymer; and their modified products.

The resin particles used in the present invention may have various shapes such as spherical (true-spherical, approximately spherical, or approximately ellipsoidal spherical), polygonal, or plate, but are preferably spherical.

Of the resin particles described above, the hollow resin particles having voids within the particles can be used as white pigments, and the colored resin particles of 1) to 6) can be used as fluorescent pigments, thermochromic pigments, and photochromic pigments in the form of microencapsulated pigments and microspheres (colorants). Furthermore, the resin particles of 1) to 6) described above may be the resin particles produced by various methods, and may be commercially available products.

The content of these resin particles varies depending on the purpose such as the case where the resin particles are used alone as a colorant, or the case where non-colored resin particles and colored resin particles to be a colorant are used in combination. The appropriate content depends on the cases where the resin particles are used as, for example, a masking agent, a sealing agent, or a colorant. Specifically, the drop in initial touch and the content of the resin particles tends to be generally proportional. The higher the content, the more likely the initial touch drops.

The total content of the resin particles (solid content) used is 5 to 40%, preferably 5 to 30% relative to the total amount of the ink composition, from the perspective of high compatibility of writing performance, line drawing quality, and initial touch. If the content of the resin particles is less than 5%, writing performance and line drawing quality will be inferior, whereas in a case where the content exceeds 40%, the drop in initial touch is observed. Both the cases are not preferable.

Additionally, the average particle size of the resin particles tends to be approximately proportional to the drop in initial touch. When the average particle size of the resin particles is 0.4 µm or more, a drop in the initial touch is slightly observed, and when the average particle size is 1.0 µm or more, the initial touch tends to further drop. The upper limit of the average particle size is preferably 20 µm or less in consideration of writing performance and line drawing quality.

The aqueous ink composition for ballpoint pen according to the present invention may further include, in addition to the graft compound and the resin particles, water as a solvent (e.g., tap water, purified water, distilled water, ion exchanged water, or pure water) for balance, other colorants, commonly used components such as water-soluble organic solvents, thickeners, lubricants, corrosion inhibitors, preservatives, fungicides, or pH modifiers in appropriate amounts within a range that does not impair the effects of the present invention.

Examples of the other colorants that may be used include pigments and/or water-soluble dyes that are commonly used in aqueous ink compositions for writing instruments. The pigment may be optionally selected from inorganic and organic pigments.

Examples of the inorganic pigment include carbon black, titanium oxide, and metal powder. Examples of the organic pigments include azo lake, insoluble azo pigments, chelete azo pigments, phthalocyanine pigments, perylene and perinone pigments, anthraquinone pigments, quinacridone pigments, lake dyes, nitro pigments, and nitroso pigments.

The water-soluble dye may be a direct dye, an acid dye, an edible dye, or a basic dye.

These colorants may be used alone or in combination of two or more of colorants in appropriate amounts.

Examples of the water-soluble organic solvent that may be used include glycols such as ethylene glycol, diethylene glycol, triethylene glycol, propylene glycol, polyethylene glycol, 3-butylene glycol, thiodiethylene glycol, and glycerin; ethylene glycol monomethyl ether, and diethylene glycol monomethyl ether. The solvents may be used alone or as a mixture.

The content of the water-soluble organic solvents varies depending on the purpose. For example, the content preferably exceeds 10% for the purpose of improving the writing touch and preventing drying of the pen tip.

On the other hand, in a writing instrument using ink containing resin particles having a large average particle size, the ink flow rate is often increased. As a result, the problem of decrease in drying of the drawn line likely occurs. Therefore, it is desirable to reduce the content within a range that does not impair the overall performance of a writing instrument. The content is preferably 10% or less, and more preferably 5 to 10% based on the total amount of the ink composition from the above-described perspective.

The thickener that may be used herein is preferably, for example, at least one selected from the group consisting of synthetic polymers, cellulose, and polysaccharides. Specific examples include gum arabic, gum tragacanth, guar gum, locust bean gum, alginic acid, carrageenan, gelatin, xantan gum, welan gum, succinoglycan, dietheutan gum, dextran, methyl cellulose, ethyl cellulose, hydroxyethyl cellulose, carboxymethyl cellulose, starch glycolic acid and salt thereof, propylene glycol alginate ester, polyvinylalcohol, polyvinylpyrrolidone, polyvinylmethyl ether, polyethylene oxide, vinyl acetate-polyvinyl pyrrolidone copolymer, crosslinked acrylic acid polymer and salt thereof, uncrosslinked acrylic acid polymer and salt thereof, and styrene-acrylic acid copolymer and salt thereof.

Examples of the lubricant include, but are not limited to, non-ionic surfactants such as fatty acid esters of polyol, higher fatty acid esters of sugars, polyoxyalkylene higher fatty acid esters, and alkyl phosphate esters, anionic surfactants such as alkyl sulfonate salts of higher fatty acid amides, and alkyl aryl sulfonate salts, and derivatives of polyalkylene glycols, fluorochemical surfactants, and polyether modified silicones also used as surface treating agents for pigments.

Examples of the corrosion inhibitor include benzotriazol, tolyltriazole, dicyclohexylammonium nitrite, and saponins. Examples of the preservative or fungicides include and phenol, sodium omadine, sodium benzoate, benzoisothiazolin, and benzimidazole compounds.

Examples of the pH modifier include hydroxides of alkali metals such as sodium hydroxide, potassium hydroxide, and lithium hydroxide; amine compounds such as triethanolamine, diethanolamine, monoethanolamine, dimethylethanolamine, morpholine, and triethylamine; and ammonia.

The production of the present aqueous ink composition for ballpoint pen may use known methods, and the composition can be used by, for example, stirring and mixing the graft compound represented by Formula (I), the resin particles, other colorants, and the above-described aqueous components in specified amounts using a mixer such as a homomixer or a disperser. Further optionally, coarse particles in the ink composition may be removed by filtration or centrifugation.

The resulting aqueous ink composition for ballpoint pen in an embodiment of the present invention is used in ink refills equipped with a ballpoint pen tip such as a metal chip or resin chip, and ballpoint pens.

The ink composition for aqueous ballpoint pen in the present invention includes at least 0.1 to 5% by mass of the graft compound, 5 to 40% by mass of resin particles, and water, and thus achieves excellent ink discharge properties (initial touch) even after exposure of the pen tip over a long period of time.

EXAMPLES

Next, the embodiments of the present invention shall be explained in further detail with examples and comparative examples, but the present invention are not limited to the following examples and the like.

The microspheres and the thermochromic microcapsule pigments used in the examples and comparative examples were obtained by Production Examples 1 and 2 described below.

Production Example 1 (Production of Microsphere A)

(Preparation of Oil Phase Solution)

While heating 12.5 parts by mass of ethyl acetate as an organic solvent to 60° C., 3.5 parts by mass of oil-soluble black dye (Oil Black 860, manufactured by Orient Chemical Industries Co., Ltd.) as a water-insoluble dye and 0.5 parts by mass of a terpene phenol resin (YS Polystar N125, manufactured by Yasuhara Chemical Co., Ltd.) were added thereto and sufficiently dissolved. Next, 8 parts by mass of an isocyanurate-modified product of hexamethylene diisocyanate as a prepolymer (TLA-100, available from Asahi Kasei Chemicals Corporation) was added thereto to prepare an oil phase solution.

(Preparation of Water Phase Solution)

While heating 200 parts by mass of distilled water to 60° C., 15 parts by mass of polyvinyl alcohol (PVA-205, manufactured by Kuraray Co., Ltd.) as a dispersing agent was dissolved therein to prepare an aqueous phase solution.

(Emulsion Polymerization)

The oil phase solution was added to the water phase solution at 60*C, and stirred with a homogenizer for 6 hours for emulsion polymerization, thus completing polymerization. The obtained dispersion was centrifuged to recover microspheres, thus obtaining black microspheres A.

Production Example 2 (Production of Thermochromic Microcapsule Pigment)

As a leuco dye, 1 part of methyl-3',6'-bisdipheny-laminofluorane, 2 parts of 1,1-bis (4-hydroxyphenyl)-cyclohexane as a developer, and 24 parts of bis(4-hydroxyphenyl)-phenylmethane dicaprylate as a chromic temperature modifier were heated 100° C. to melt, thus obtaining 27 parts of a homogeneous composition. To a homogeneous hot solution of 27 parts of the composition obtained above, 10 parts of isocyanate and 10 parts of polyol were added and stirred. Next, 60 parts of 12% polyvinyl alcohol aqueous solution were used as a protective colloid, and emulsified at 25° C. to prepare a dispersion. Next, 5 parts of 5% polyamine was treated at 80° C. for 60 minutes, thus obtaining microcapsules. The microencapsulated water dispersion obtained by the above procedure was spray-dried to form a powder, thus producing a thermochromic microcapsule pigment. The thermochromic microcapsule pigment was in blue at room temperature, and became colorless (decolorized) at 60° C. or higher.

Examples 1 to 5 and Comparative Examples 1 to 5

According to the recipe (total: 100% by mass) shown in Table 1, each aqueous ink composition for ballpoint pen was prepared by an ordinary method.

Making of Aqueous Ink Ballpoint Pen

Aqueous ink ballpoint pens were made using each of the ink compositions obtained above. Specifically, using a barrel of a ballpoint pen (UF-202, manufactured by Mitsubishi Pencil Co., Ltd.), a refill including an ink reservoir made of polypropylene having an inner diameter of from 3.8 mm and a length of 90 mm, a stainless steel tip (cemented carbide ball, ball diameter: 0.5 mm) and a joint connecting the reservoir and the tip were filled with the aqueous inks described above, and an ink follower composed mainly of a mineral oil was inserted at the rear end of the ink, thus making an aqueous ballpoint pen.

The obtained aqueous ballpoint pens of Examples 1 to 5 and Comparative Examples 1 to 5 were used to evaluate the initial writing performance by the following evaluation methods.

These results are shown in Table 1 below.

For the aqueous ink ballpoint pens, after being left to stand for 1 week at 25° C. and 60% RH without a cap, straight lines were drawn on PPC paper, and the initial touch was evaluated on the basis of the following evaluation criteria.

Evaluation Criteria:

A: Writable without problem from the start of writing

B: Blurring of less than 1 mm is confirmed from the start of writing

C: Blurring of 1 mm or more is confirmed from the start of writing

TABLE 1

|  |  |  | \*(Total: 100% by mass) Example | | | | |
|---|---|---|---|---|---|---|---|
|  |  |  | 1 | 2 | 3 | 4 | 5 |
| Colorant | A-1 | *1 | 10 |  |  |  |  |
|  | B-1 | *2 |  | 12 |  |  |  |
|  | C-1 | *3 |  |  | 20 |  |  |
|  | D-1 | *4 |  |  |  | 15 |  |
|  | E-1 | *5 |  |  |  |  | 18 |
| Thickener | Xantan gum | *6 | 0.3 | 0.3 | 0.3 | 0.24 | 0.24 |
| Corrosion inhibitor | Benzotriazol |  | 0.3 | 0.3 | 0.3 | 0.3 | 0.3 |
| Preservative | Benzoisothiazolin & others | *7 | 0.3 | 0.3 | 0.3 | 0.3 | 0.3 |
| pH modifier | Triethanolamine |  | 0.5 | 0.5 | 0.5 | 0.5 | 0.5 |
| Lubricant | Phosphate ester | *8 | 0.5 | 0.5 | 0.5 | 0.5 | 0.5 |
| Graft compound | Compound of Formula (II) | *9 |  | 0.2 |  |  | 1 |
|  | Compound of Formula (III) | *10 | 0.5 |  | 0.8 | 0.4 |  |
| Solvent | Glycerin |  | 10 | 5 | 8 | 10 | 5 |
|  | Propylene glycol |  |  | 5 | 5 |  | 5 |
| Water | Purified water |  | balance | balance | balance | balance | balance |
|  | Initial touch |  | A | B | A | A | A |

|  |  |  | (Total: 100% by mass) Comparative Example | | | | |
|---|---|---|---|---|---|---|---|
|  |  |  | 1 | 2 | 3 | 4 | 5 |
| Colorant | A-1 | *1 | 10 |  |  |  |  |
|  | B-1 | *2 |  | 12 |  |  |  |
|  | C-1 | *3 |  |  | 20 |  |  |
|  | D-1 | *4 |  |  |  | 15 |  |
|  | E-1 | *5 |  |  |  |  | 18 |
| Thickener | Xantan gum | *6 | 0.3 | 0.3 | 0.3 | 0.24 | 0.24 |
| Corrosion inhibitor | Benzotriazol |  | 0.3 | 0.3 | 0.3 | 0.3 | 0.3 |
| Preservative | Benzoisothiazolin & others | *7 | 0.3 | 0.3 | 0.3 | 0.3 | 0.3 |
| pH modifier | Triethanolamine |  | 0.5 | 0.5 | 0.5 | 0.5 | 0.5 |
| Lubricant | Phosphate ester | *8 | 0.5 | 0.5 | 0.5 | 0.5 | 0.5 |
| Graft compound | Compound of Formula (II) | *9 |  |  |  |  |  |
|  | Compound of Formula (III) | *10 |  |  |  |  |  |
| Solvent | Glycerin |  | 10 | 5 | 8 | 10 | 5 |
|  | Propylene glycol |  |  | 5 | 5 |  | 5 |
| Water | Purified water |  | balance | balance | balance | balance | balance |
|  | Initial touch |  | C | C | C | C | C |

*1 to *10 above are as described below.

*1 ART-PEARL C800 Black (manufactured by Negami Chemical Industrial Co., Ltd., crosslinked urethane, average particle size: 6 μm)

*2 RUBCOULEUR 224 (SM) Black (manufactured by Dainichiseika Color & Chemicals Mfg. Co., Ltd., acrylic, average particle size: 2 to 3 μm)

*3 FZ-2007 Pink (manufactured by Sinloihi, Co., Ltd., fluorescent pigment, average particle size: 3 to 4 μm)

*4 Microsphere A (Production Example 1, average particle size: 1 μm)

*5 Thermochromic microcapsule pigment (Production Example 2, average particle size: 2 μm)

*6 KELZAN S (manufactured by Sansho Co., Ltd.)

*7 BIODEN 421 (manufactured by Daiwa Chemical Industries Co., Ltd.)

*8 RD-510Y (manufactured by Toho Chemical Industry Co., Ltd.)

*9 MALIALIM AKM-0531 (manufactured by NOF Corporation, mass average molecular weight: 15000)

*10 MALIALIM SC-0505K (manufactured by NOF Corporation, mass average molecular weight: 10000)

As is evident from the results shown in Table 1 above, it was found that the aqueous ink compositions for ballpoint pen of Examples 1 to 5 within the scope of the present invention have excellent ink discharge properties at the time of initial writing (initial touch) even after exposure of the pen tip for a long period of time, in comparison with the aqueous ink compositions for ballpoint pen of Comparative Examples 1 to 5, which are out of scope of the embodiments of the present invention.

INDUSTRIAL APPLICABILITY

An aqueous ink composition for ballpoint pen suitable for ballpoint pens is obtained.

The invention claimed is:

1. An aqueous ink composition for a ballpoint pen, wherein the aqueous ink composition comprises at least:
   0.1 to 5% by mass of a graft compound of an allyl alcohol-maleic anhydride-styrene copolymer and polyoxyalkylene monoalkyl alcohol, composed of (a) a polyoxyalkylene alkyl ether unit represented by Formula (I), (b) a maleic anhydride unit, and (c) a styrene unit, the allyl alcohol-maleic anhydride-styrene copolymer having the composition ratio (a):(b):(c) of 25 to 75:25 to 75:0 to 50% by mol and having a mass average molecular weight from 1000 to 50000;
   5 to 40% by mass of resin particles; and
   water;

[Chemical Formula 1]

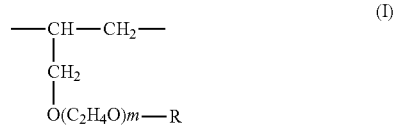

(I)

wherein in Formula (I), E represents an alkyl group having 1 to 5 carbons, and m is a positive number of 5 to 50, and
wherein the resin particles comprise colored resin particles.

2. The aqueous ink composition according to claim 1, wherein the graft compound is at least one represented by Formula (II)

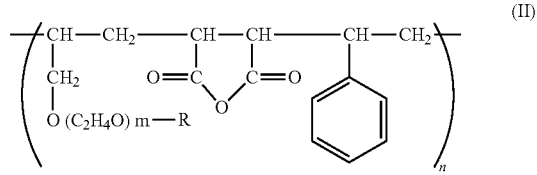

(II)

wherein m=11 to 28, n=18 to 20, and it has a mass average molecular weight of 15000 to 40000.

3. The aqueous ink composition according to claim 1, wherein the graft compound is at least one represented by Formula (III)

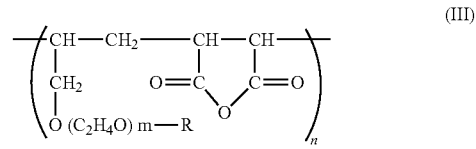

(III)

wherein m=11, n=14, and it has a mass average molecular weight of 10000.

4. The aqueous ink composition according to claim 1, wherein the ink composition further includes a water-soluble organic solvent.

5. The aqueous ink composition according to claim 1, wherein the graft compound is at least one represented by Formula (II)

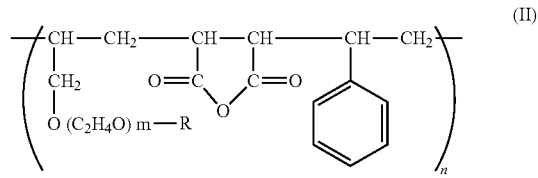

(II)

wherein m=11 to 28, n=18 to 20, and it has a mass average molecular weight of 15000 to 40000.

6. The aqueous ink composition according to claim 1, wherein the graft compound is at least one represented by Formula (III)

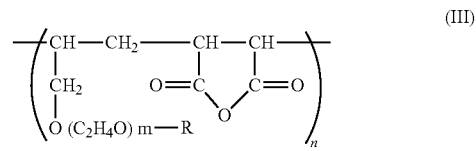

(III)

wherein m=11, n=14, and it has a mass average molecular weight of 10000.

7. The aqueous ink composition according to claim 1, wherein the ink composition further includes a water-soluble organic solvent.

* * * * *